United States Patent Office 3,740,419
Patented June 19, 1973

3,740,419
PESTICIDAL COMPOSITIONS
Craig C. Campbell, Cherry Hill, N.J., assignor to
Mobil Oil Corporation
No Drawing. Filed Jan. 20, 1971, Ser. No. 108,181
Int. Cl. A01n 9/00
U.S. Cl. 424—21                                  33 Claims

ABSTRACT OF THE DISCLOSURE

A pesticidal composition is provided comprising a carrier impregnated with a pesticidal agent and coated with a wax emulsion capable of releasing the pesticidal agent at a controlled rate. Also provided is a method for combatting pests employing such compositions.

BACKGROUND OF THE INVENTION

(1) Field of the invention

This invention relates to pesticidal compositions and, in one of its aspects, relates more particularly to pesticidal compositions which are capable of releasing the pesticidal agent at a controlled rate. Still more particularly, in this aspect, the invention relates to pesticidal compositions which not only permit controlled release of the toxicant over relatively long time intervals, but also minimize loss of the toxicant by leaching.

(2) Description of the prior art

While the use of pesticidal agents as, for example, systemic insecticides directly in the soil, or in other pesticidal applications, is well known, difficulty is often encountered in obtaining sufficient concentration of the pesticide to be effective for as long a period as desired. Such a problem is particularly apparent where seed planting is employed with densely packed plants, for example, high-density crops for machine harvesting. In such instances, repetitive treatments become difficult because of such high plant density during the growing season. Thus, it is highly desirable to be able to employ the pesticidal agent in such form that not only is loss by leaching kept to a minimum, but also of permitting controlled release of a pesticidal agent over a relatively long time interval. The term "pesticide" as herein employed is intended to denote those agents which are capable of combatting or controlling agricultural or other types of pests, including insects, fungi, mites, nematodes and other forms of animal and plant life.

SUMMARY OF THE INVENTION

It has now been found, as more fully hereinafter described, that controlled release and prolonged use of pesticidal agents can be realized by encapsulation of the pesticidal agent in such a manner that a pesticidal composition is produced in which a carrier material is impregnated with the pesticidal agent and coated with a wax emulsion capable of releasing the pesticidal agent at a controlled rate and also capable of minimizing loss of the pesticides by leaching, for example, by rain or other external factors, during the period of application.

With respect to the pesticidal agents employed in the novel compositions of the present invention, any pesticidal agents may be utilized which are capable of impregnating a suitable carrier material, and, therefore, may include any of the known pesticides. Representative thereof, but not limiting, are such pesticides as O,O-diethyl-S-[2-(ethylthio) ethyl] phosphorodithioate;
3-(3,4-dichlorophenyl)-1-methoxy-1-methylurea;
1-naphthyl-N-methylcarbamate;
1,1,1-trichloro-2,2-bis(p-chlorophenyl) ethane;
2,2-bis(p-methoxyphenyl)-1,1,1-trichloroethane;
4-benzothienyl-N-methylcarbamate;
N-(mercaptomethyl) phthalamide S-(O,O-dimethyl phosphorodithioate);
2,4-dichlorophenoxyacetic acid; and
3-amino-2,5-dichlorobenzoic acid.

Insofar as the pesticidal agent is concerned, it may be employed in any desired effective pesticidal quantity. For most purposes, the pesticidal agent, from a practical standpoint is effectively employed in an amount from about 1% to about 50%, and preferably from about 1% to about 10%, by weight. Insofar as the carrier material is concerned, any material may be employed for this purpose which is capable of being impregnated by the selected pesticidal agent. Representative of such carrier materials, but not limiting, are wood chips, asbestos, corn cob dust, bark and various other forms of absorbent materials.

The wax component of the emulsion may comprise any wax, such as a paraffin wax, scale wax or slack wax, obtained from petroleum oil by distillation or solvent extraction, and may include microcrystalline wax and/or petrolatum such as obtained from petroleum residua; also, petroleum waxes modified with various polymers, e.g., polyethylene, or copolymers such as ethylenevinyl acetate copolymers and similar polymeric materials. In general, paraffin wax having a melting point of from about 115° F. to about 150° F. is preferred, and such wax may comprise high molecular weight hydrocarbons, being generally straight-chain compounds having a crystalline structure in solid form. Microcrystalline wax may be employed, as hereinbefore indicated, and is obtained from petroleum oil by distillation or fractional crystallization, employing selected solvents. This material may possess a melting point of about 150° F. to about 190° F. and contain a substantial portion of high molecular weight hydrocarbons having branched-chain and ring structures. Such material is more plastic in nature than paraffin wax, being amorphous in form and lacking a well-defined crystalline structure. For most purposes the wax component is employed in an amount from about 20 to about 65, and preferably from about 35 to about 50%, by weight, of the total quantity of the emulsion. In certain instances, petrolatum may also be present in conjunction with the paraffin wax to comprise the wax phase of the emulsion. Petrolatum is commercially obtained from petroleum and largely contains paraffin wax in substantial amount, namely, as high as 30 to 40 percent of the total wax content. Where petrolatum is employed in the wax phase, this material is generally present in an amount from about 5 to about 50, and preferably from about 25 to about 45 percent, by weight, based on the total weight of the wax phase.

The emulsifier employed in the wax emulsions of the present invention may be of any type, thus including the nonionic, anionic and cationic types. Many non-ionic emulsifiers can be used in this emulsion provided the critical relationship between oil solubility and water solubility is maintained. Typical of such emulsifiers are mixtures of sorbitan monooleate and polyoxyethylene sorbitan monooleate. Typical other nonionic emulsifiers suitable for use in these wax emulsions are polyoxyethylene ethers of octyl or nonyl phenol having variable amounts of ethylene oxide content per mol of finished product required to provide the oil and water solubility charatceristics. Thus, for example, a portion of polyoxyethylene ethers of octyl phenol having about 5 mols of ethylene oxide per mol of finished product when blended with a like amount of polyoxyethylene ethers of octyl phenol having about 10 mols of ethylene oxide per mol of finished product, provides an emulsifier combination having the desired water and oil solubility. As the ethyylene oxide content is reduced, oil solubility is enhanced, whereas as the ethylene oxide content is increased, water solubility is enhanced. A blended product having sufficient oil-soluble and water-soluble constituents and possessing an average ethylene oxide content per mol of finished product between about 5 and 10 is quite satisfactory. Other non-ionic emulsifiers contemplated within the scope of the present emulsions are exemplified by partial esters of fatty acids (e.g., palmitic, stearic, oleic and the like) and hexitol anhydrides (hexitans and hexides) derived from sorbitol. These materials, to which polyoxyethylene chains have been added to the non-esterified hydroxyls to increase water solubility, are blended with the untreated material to provide solubility balance. Also usable in this area are the condensation products of ethylene oxide and relatively high molecular weight polypropylene glycol. The molecular weight of the polypropyleneglycol portion may be 1,000–2,000. The molecular weight of the compound may be as high as 8,000. For most purposes the emulsifier is employed in an amount from about 2 to about 10, and preferably from about 4 to about 8%, by weight, of the total quality of the emulsion.

As hereinbefore indicated, the emulsifier employed in the wax emulsion may be of the anionic type. These may include triethanolamine or other soaps, lignin sulfonates, naphthalene sulfonates and protective colloids, such as natural gums, gelatin, casein, cellulose derivatives and the like.

The emulsifiers employed in the wax emulsions of the present invention may also be of the cationic type. For this purpose, various types of cationic emulsifying agents may be employed. One preferred type is an emulsifying agent comprising an amine salt of an acid selected from the group consisting of organic acids having from about 1 to about 18 carbon atoms, or inorganic mineral acids, which are reacted with an amine having from about 10 to about 40 carbon atoms. Furthermore, it should also be noted that where the wax emulsion contains cationic emulsifiers, emulsion modifiers may also be present, such as amines having up to 12 carbon atoms per molecule, and may therefore comprise aliphatic, cycloaliphtic, aromatic and primary, secondary or tertiary amines. Representative amines employed as the emulsion modifier include dicyclohexylamine, n-heptyl B-amine, n-octyl amine, n-dodecylamine, n-dodecyl 1,3-propylene diamine, aniline and N-dodecyl 1,3-propylene B-diamine. Water, as previously indicated, is employed in an amount sufficient to balance the formulation, and may therefore be present, for example, in an amount varying from about 25 to about 88%, by weight, of the total wax emulsion. Emulsions of the above described components, and containing pesticidal agents in the form of dioxane solutions, may also provide further utility when employed, for example, in controlling transpiration in plants.

In addition to the aforementioned components of the novel wax emulsions of the present invention, there may also be present, if so desired, minor amounts of wetting agents such as iso-octyl phenoxy polyethoxyethanol, esters of sodium, sulfosuccinic acid and alcohol sulfates. It will also be noted that additional pesticides, whether capable or not, of impregnating the carrier material may also be incorporated in the wax emulsion such as 1,1-trichloro-2,2-bis(p-chlorophenyl)ethane, benzene hexachloride, formaldehydes, phenolic compounds and, particularly, chlorinated phenolic compounds.

When employed as pesticidal compositions for the protection of plant life, the wax emulsion may also contain minor amounts of materials which have an effect on stomatal closure by a biochemical mechanism. Notably, phenyl mercuric acetate and the monoethyl and monoglyceryl esters of decenylsuccinic acid are reported to have this effect. Other materials which may physically block the stomata would include clay-like materials. Presumably, a plate-like structure may cover or partially cover the stomata so that the passage of water therethrough is retarded. An added benefit of caly-like particles, including pigments such as titanium dioxide, lies in their ability to reflect strong rays of the sun, which might otherwise damage leaf tissue because of excessive heat in addition to causing excessive water loss. In addition, the wax emulsion may also have incorporated therein minor amounts of thickening agents such as cellulose derivatives, natural gums, or water dispersible synthetic polymers, for maintaining contact of the wax emulsion with the plant surface. The emulsion may also include nutrients and fertilizers if so desired.

DESCRIPTION OF SPECIFIC EMBODIMENTS

The following data and examples will serve to illustrate the novel pesticidal compositions of the present invention and their efficacy in combatting pesticidal attack wih a prolonged kill effect and at a controlled rate.

Example 1

4668 grams of Douglas Fir wood chips (Hammer milled planar shavings) were placed in a drum mixer in preparation for spray application of pesticide. 163 grams of O,O-diethyl-S-[2-(ethylthio)-ethyl] phosphorodithioate mixture containing 72%, by weight, of chemical solids in water (i.e. net solids=117 grams or 2.5%, by weight, of 4668 grams of wood chip weight) were diluted in a 2:1 ratio (326 grams of water and 163 grams of chemical solution).

The above-prepared diluted mixture was next sprayed onto the wood chips by means of an air nozzle directed into the tumbling drum mixer as it was rotated at about 40 r.p.m. by means of a roller table. All the equipment employed was contained in a forced-air hood.

A wax emulsion was prepared having the following formulation.

|  | Percent (weight) |
|---|---|
| Paraffin wax (125/130° F. AMP) | 25.5 |
| Petrolatum | 14.5 |
| Sorbitan monooleate | 2.5 |
| Polyoxylene sorbitan monooleate | 2.3 |
| $C_{16}$–$C_{18}$ tallow fatty acids | 1.0 |
| Triethyleneamine | 0.35 |
| Formaldehyde | 0.10 |
| Water | 53.75 |
|  | 100.00 |

96 grams of the above-described emulsion, containing 45% emulsion solids (i.e. net solids=47 grams or 1.0% of 4668 grams wood chip weight) were diluted in a 2:1 ratio (152 grams of water and 96 grams of wax emulsion). Thereafter, the diluted wax emulsion was sprayed onto the wood chips by means of an air nozzle directed into the tumbling drum mixer as it was rotated at about 40 r.p.m. by means of a roller table.

Example 2

Following the procedure of Example 1, 4668 grams of Douglas Fir wood chips were placed in a drum mixer in preparation for spray application of O,O-diethyl-S-[2-(ethylthio)-ethyl] phosphorodithioate pesticide. 324 grams of the aforementioned pesticide mixture containing 72%, by weight, of chemical solids in water (i.e. net solids=234 grams or 5.0%, by weight, of 4668 grams of wood chip weight) were diluted in a 2:1 ratio (648 grams of water and 324 grams of chemical solution).

The above-prepared diluted mixture was next sprayed onto the wood chips by means of an air nozzle directed into the tumbling drum mixer as it was rotated at about 40 r.p.m. by means of a roller table. All the equipment employed was contained in a forced-air hood.

Employing the same wax emulsion as in Example 1 (supra), 96 grams of the emulsion, containing 45% emulsion solids, were diluted in a 2:1 ratio, as in Example 1. Thereafter the diluted wax emulsion was sprayed onto the wood chips by means of an air nozzle directed into the tumbling drum mixer as it was rotated at about 40 r.p.m. by means of a roller table.

As shown in the following Table I, a field test was carried out for obtaining comparisons of degree of potato beetle damage between employing emulsion encapsulated pesticide, the pesticide in granular or unencapsulated form, and untreated acreage. In these tests Katahdin variety potatoes were employed and comparisons of potato beetle attack up to 80 days after planting were made. The two formulations of Example 1 (Test A) and Example 2 (Test B) were applied to the furrow in conventional manner prior to planting the potatoes. In Test C a granular or unencapsulated formulation of the insecticide was applied, while Test D represented untreated acreage. All applications of the insecticide were made at the rate of three pounds active insecticide per acre. Each test was replicated four times for a mean percent determination of insect damage after planting time. Insect counts and estimates of defoliation were made at ten-day intervals with the first examination of the plants taking place 60 days after planting.

TABLE I.—COMPARISON OF POTATO BEETLE DAMAGE
[Mean percent insect damage after planting time]

| Test | 60 days | 70 days | 80 days | Averag- |
|---|---|---|---|---|
| A (Example 1) | 0.0 | 0.5 | 4.5 | 1.7 |
| B (Example 2) | 0.5 | 2.0 | 2.8 | 1.8 |
| C (Unencapsulated insecticide) | 0.0 | 1.0 | 5.2 | 2.1 |
| D (Untreated acreage) | 1.8 | 4.0 | 3.2 | 3.0 |

As will be seen from the data of Table I, the formulation of Example 1 (Test A) (2.5% insecticide), and the formulation of Example 2 (Test B) (5% insecticide), resulted in less mean acreage insect daamge than in Test C (granular or unencapsulated insecticide) or in Test D (untreated acreage).

As is shown in the following Table II, another field test was carried out, for comparative purposes, as in Table I, with respect to the degree of flea beetle damage up to 70 days after planting.

TABLE II.—COMPARISON OF FLEA BEETLE DAMAGE
[Mean number of flea beetle feeding scars]

| Test | 60 days | 70 days | Average |
|---|---|---|---|
| A (Example 1) | 0.8 | 3.5 | 2.1 |
| B (Example 2) | 4.5 | 2.8 | 3.6 |
| C (Unencapsulated insecticide) | 13.0 | 12.0 | 12.5 |
| D (Untreated acreage) | 14.5 | 10.8 | 12.6 |

As will be seen from the data of Table II, the formulation of Example 1 (Test A) (2.5% insecticide), and the formulation of Example 2 (Test B) (5% insecticide), resulted in less mean acreage insect damage than in Test C (granular or unencapsulated insecticide) or in Test D (untreated acreage). Other pesticidal agents may also be effectively substituted for that of Examples 1 and 2, supra, if so desired.

From the foregoing data and examples it will be apparent that the pesticidal compositions of the present invention are highly effective in permitting the release of the pesticidal agent at a desired controlled rate, and that these compositions may be employed for various types of applications and purposes. These compositions may be applied to plant and other surfaces for their pesticidal effect and the emulsions can, of course, be varied for adapting them to specific commercial requirements. Although the present invention has been described herein by means of certain specific embodiments and illustrative examples, it is not intended that the scope thereof be limited in any way and the invention is capable of various modifications and adaptations, as those skilled in the art will readily appreciate.

I claim:

1. A pesticidal composition consisting essentially of an absorbent carrier seelcted from the group consisting of wood chips, asbestos, corn cob dust and bark impregnated with a pesticidal agent capable of impregnating said carrier and coated with a pesticidal-free wax emulsion capable of releasing the pesticidal agent at a controlled rate, said emulsion comprising, by weight, from about 20% to about 65% wax, from about 2% to about 10% of an emulsifier and from about 25% to about 88% water.

2. The method of combatting pests which comprises contacting them with a pesticidal composition as defined in claim 1.

3. The pesticidal composition of claim 1 wherein said emulsion comprises, by weight, from about 35% to about 50% wax and from about 4% to about 8% of an emulsifier.

4. The pesticidal composition of claim 1 wherein a petrolatum is present in said emulsion in an amount from about 5% to about 50%, by weight, based on the total weight of the wax phase.

5. The pesticidal composition of claim 1 wherein petrolatum is present in said emulsion in an amount from about 25% to about 45%, by weight, based on the total weight of the wax phase.

6. The pesticidal composition of claim 1 wherein said emulsion comprises a paraffin wax and an emulsifier selected from the group consisting of non-ionic and anionic emulsifiers.

7. The pesticidal composition of claim 6 wherein the emulsifier comprises a mixture of sorbitan monooleate and polyoxyethylene sorbitan monooleate.

8. The pesticidal composition of claim 6 wherein the emulsifier comprises a triethanolamine soap.

9. The pesticidal composition of claim 6 wherein the emulsifier comprises an amine salt of an acid selected from the group consisting of organic acids having from about 1 to about 18 carbon atoms and inorganic mineral acids reacted with an amine having from about 10 to about 40 carbon atoms.

10. The pesticidal composition of claim 1 wherein said pesticidal agent comprises O,O-diethyl-S-[2-(ethylthio)-ethyl] phosphorodithioate.

11. The pesticidal composition of claim 1 wherein said pesticidal agent comprises 3-(3,4-dichlorophenyl)-1-methoxy-1-methylurea.

12. The pesticidal composition of claim 1 wherein said pesticidal agent comprises 1-naphthyl-N-methylcarbamate.

13. The pesticidal composition of claim 1 wherein said pesticidal agent comprises 1,1,1-trichloro-2,2-bis(p-chlorophenyl) ethane.

14. The pesticidal composition of claim 1 wherein said pesticidal agent comprises 2,2-bis(p-methoxyphenyl-1,1,1-trichloroethane.

15. The pesticidal composition of claim 1 wherein said pesticidal agent comprises 4-benzothienyl-N-methylcarbamate.

16. The pesticidal composition of claim 1 wherein said pesticidal agent comprises N-(mercaptomethyl)phthalamide S-(O,O-dimethyl phosphorodithioate).

17. The pesticidal composition of claim 1 wherein said pesticidal agent is present in minor proportions.

18. The pesticidal composition of claim 1 wherein said pesticidal agent is present in an amount from about 1% to about 50%, by weight.

19. The pesticidal composition of claim 1 wherein said pesticidal agent is present in an amount from about 1% to about 10%, by weight.

20. The method of claim 2 wherein said emulsion comprises, by weight, from about 35% to about 50% wax and from about 4% to about 8% of an emulsifier.

21. The pesticidal composition of claim 2 wherein a petrolatum is present in said emulsion in an amount from about 5% to about 50%, by weight, based on the total weight of the wax phase.

22. The method of claim 2 wherein petrolatum is present in said emulsion in an amount from about 25% to about 45%, by weight, based on the total weight of the wax phase.

23. The method of claim 2 wherein said emulsion comprises a paraffin wax and an emulsifier selected from the group consisting of non-ionic and anionic emulsifiers.

24. The method of claim 23 wherein the emulsifier comprises a mixture of sorbitan monooleate and polyoxyethylene sorbitan monooleate.

25. The method of claim 23 wherein the emulsifier comprises a triethanolamine soap.

26. The method of claim 23 wherein the emulsifier comprises an amine salt of an acid selected from the group consisting of organic acids having from about 1 to about 18 carbon atoms and inorganic mineral acids reacted with an amine having from about 10 to about 40 carbon atoms.

27. The method of claim 2 wherein said pesticidal agent comprises O,O-diethyl-S-[2-(ethylthio)-ethyl] phosphorodithioate.

28. The method of claim 2 wherein said pesticidal agent comprises 3-(3,4-dichlorophenyl) - 1 - methoxy-1-methylurea.

29. The method of claim 2 wherein said pesticidal agent comprises 1-naphthyl-N-methylcarbamate.

30. The method of claim 2 wherein said pesticidal agent comprises 1,1,1-trichloro-2,2-bis(p-chlorophenyl) ethane.

31. The method of claim 2 wherein said pesticidal agent comprises 2,2-bis(p-methoxyphenyl) - 1,1,1 - trichloroethane.

32. The method of claim 2 wherein said pesticidal agent comprises 4-benzothienyl-N-methylcarbamate.

33. The method of claim 2 wherein said pesticidal agent comprises N-(mercaptomethyl)phthalamide S-(O,O-dimethyl phosphorodithioate).

References Cited
UNITED STATES PATENTS

| | | | |
|---|---|---|---|
| 3,372,019 | 3/1968 | Fox | 71—64 |
| 3,300,294 | 1/1967 | Hollstein | 71—28 |
| 3,259,482 | 7/1966 | Hansen | 71—64 |
| 3,008,871 | 11/1961 | Feinberg | 424—78 |

SHEP K. ROSE, Primary Examiner

U.S. Cl. X.R.

424—38, 78, 358